(12) United States Patent
Shah

(10) Patent No.: US 9,880,868 B2
(45) Date of Patent: *Jan. 30, 2018

(54) MODIFYING AN OS INSTALLER TO ALLOW FOR HYPERVISOR-SPECIFIC ADJUSTMENT OF AN OS

(75) Inventor: Amit Shah, Pune (IN)

(73) Assignee: Red Hat, Inc., Raleigh, NC (US)

( * ) Notice: Subject to any disclaimer, the term of this patent is extended or adjusted under 35 U.S.C. 154(b) by 230 days.

This patent is subject to a terminal disclaimer.

(21) Appl. No.: 13/307,935

(22) Filed: Nov. 30, 2011

(65) Prior Publication Data

US 2013/0139154 A1 May 30, 2013

(51) Int. Cl.
G06F 9/455 (2006.01)

(52) U.S. Cl.
CPC ............ *G06F 9/45558* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 7,356,679 B1* | 4/2008 | Le et al. | 713/1 |
| 8,589,918 B1 | 11/2013 | Sapuntzakis et al. | |
| 2008/0163207 A1* | 7/2008 | Reumann et al. | 718/1 |
| 2010/0235831 A1* | 9/2010 | Dittmer | 718/1 |
| 2011/0161952 A1* | 6/2011 | Poddar | G06F 9/455 717/173 |
| 2011/0231839 A1* | 9/2011 | Bennett et al. | 718/1 |
| 2012/0233608 A1* | 9/2012 | Toeroe | 718/1 |
| 2013/0139155 A1 | 5/2013 | Shah | |

OTHER PUBLICATIONS

Innotek GmbH; Innotek virtuabox user manual; Oct. 18, 2007.*
Non-Final Office Action for U.S. Appl. No. 13/307,963 dated Nov. 27, 2013.
Final Office Action for U.S. Appl. No. 13/307,963 dated Apr. 3, 2014.
Non-Final Office Action for U.S. Appl. No. 13/307,963 dated Aug. 25, 2014.
Final Office Action for U.S. Appl. No. 13/307,963 dated Dec. 23, 2014.

* cited by examiner

*Primary Examiner* — Dong Kim
(74) *Attorney, Agent, or Firm* — Lowenstein Sandler LLP

(57) ABSTRACT

An installer installing an operating system on a host computer system detects that the operating system is to be run under a hypervisor, and causes at least one configuration parameter of the operating system to be adjusted based on the hypervisor. A migration tool migrating a virtual machine from one hypervisor to another hypervisor, identifies the types of the two hypervisors, the operating system used by the virtual machine, and causes at least one configuration parameter of the operating system to be adjusted based on the target hypervisor.

21 Claims, 13 Drawing Sheets

MODIFYING AN OS INSTALLER TO ALLOW FOR HYPERVISOR-SPECIFIC ADJUSTMENT OF AN OS

TECHNICAL FIELD

Embodiments of the present invention relate to a computer system, and more specifically, to modifying an operating system installer and/or a migration tool to allow for hypervisor-specific adjustment of an operating system.

BACKGROUND

A virtual machine is a software implementation of a machine (computer) that includes its own operating system (referred to as a guest operating system) and executes application programs. A host computer allocates a certain amount of its resources to each of the virtual machines, and multiplexes its underlying hardware platform among the virtual machines. Each virtual machine is then able to use the allocated resources to execute its guest operating system and applications. The software layer providing the virtualization is commonly referred to as a hypervisor and is also known as a virtual machine monitor (VMM), a kernel-based hypervisor, or part of a host operating system. The hypervisor emulates the underlying hardware for the guest operating system, making the use of the virtual machine transparent to the guest operating system and the user of the computer.

Generally, an operating system is installed and executed on a physical machine (e.g., physical hardware rather than a virtual machine). An installer may set the configuration parameters (e.g., settings, parameters, options, configurations, etc.) of an operating system to enable the operating system to run efficiently on physical hardware, rather than a virtual machine. In addition, a guest operating system that has been installed on a virtual machine under a hypervisor may be configured with certain configuration parameters for the hypervisor. When the virtual machine is migrated from a source host machine running a first hypervisor to a target host machine running a second (e.g., different) hypervisor, the operating system will still have configuration parameters configured for the first hypervisor. This may cause operating systems to execute inefficiently and/or sub-optimally when they are installed onto virtual machines.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein are systems and methods for adjusting (e.g., changing and/or updating) configuration parameters of an operating system. In one embodiment, an operating system installer executing on a virtual machine host (e.g., within a virtual machine on the virtual machine host) detects that an operating system to be installed on the virtual machine host will run under a specific hypervisor, and causes configuration parameters of the operating system to be adjusted based on the hypervisor, thereby enabling the operating system to run efficiently and/or optimally on the virtual machine host.

In another embodiment, a migration tool identifies an operating system to be migrated to the target virtual machine host and determines that the operating system will run under a specific hypervisor. The migration tool then migrates the operating system to the target virtual machine host, and causes configuration parameters of the operating system to be adjusted based on the hypervisor, thereby enabling the operating system to run efficiently and/or optimally on the target virtual machine host. In one embodiment, the migration tool may reside on the target virtual machine. In another embodiment, the migration tool may reside the host computer or on another computing device, separate from the host computer (e.g., a server).

In one embodiment, the adjustments may be optimal changes to configuration parameters (e.g., the optimal value, setting, etc., for a configuration parameter). However, in other embodiments, the adjustments may simply be changes to configuration parameters of one or more guest OSes.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
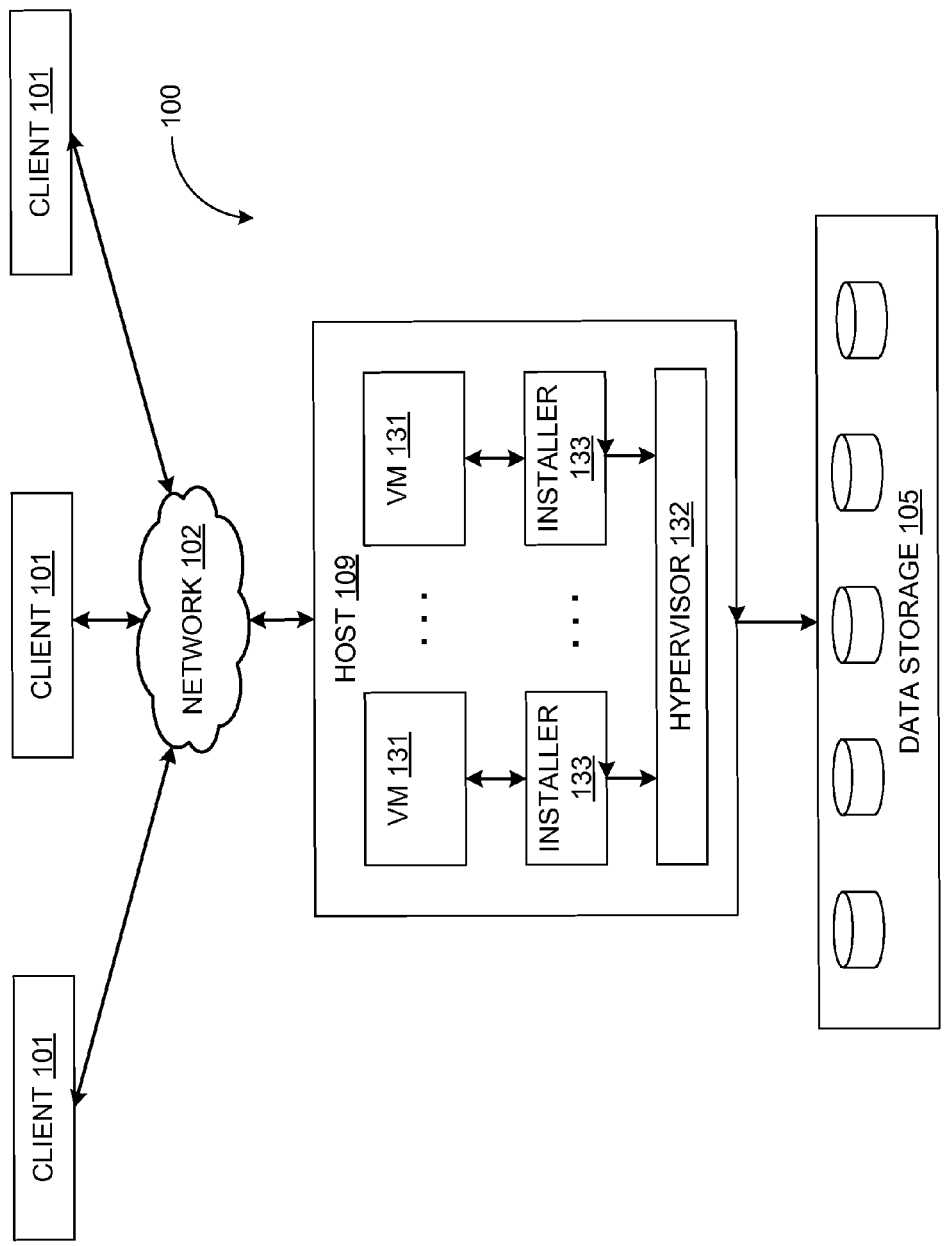
FIG. 1 is a block diagram of an exemplary network architecture in which embodiments of the invention may operate.

FIG. 1 is a block diagram of a first exemplary network architecture 100 in which embodiments of the invention may operate. The network architecture 100 includes a host machine 109 (e.g., a host computer) coupled to one or more clients 101 over a network 102. The network 102 may be a private network (e.g., a local area network (LAN), a wide area network (WAN), intranet, etc.) or a public network (e.g., the Internet). The host 109 is also coupled to data storage 105. The data storage 105 includes one or more mass storage devices (e.g., disks) which form a storage pool that may be shared by multiple hosts 109.

The host machine 109 is a computing device configured to host virtual machines. The host machine 109 may be a personal computer (PC), server computer, mainframe, or other computing system. The host machine 109 has a bare platform hardware that can include a processor, memory, input/output devices, etc. The host machine 102 may be a single machine or multiple host machines arranged in a cluster. Host machine 109 includes a hypervisor 132 (also known as a virtual machine monitor (VMM)). The hypervisor 132, though typically implemented in software, may emulate and export a bare machine interface to higher level software. Such higher level software may comprise a standard or real-time operating system (OS), may be a highly stripped down operating environment with limited operating system functionality, may not include traditional OS facilities, etc. In one embodiment, the hypervisor 132 is run directly on bare platform hardware. In another embodiment, the hypervisor 132 is run on top of a host OS. Alternatively, for example, the hypervisor 132 may be run within, or on top of, another hypervisor. Hypervisors 132 may be implemented, for example, in hardware, software, firmware or by a combination of various techniques. The hypervisor 132 presents to other software (i.e., "guest" software) the abstraction of one or more virtual machines (VMs) 131, which may provide the same or different abstractions to various guest software (e.g., guest operating system, guest applications, etc.).

A virtual machine 131 is a combination of guest software that uses an underlying emulation of a hardware machine (e.g., as provided by a hypervisor). The guest software may include a guest operating system and guest applications, guest device drivers, etc. Virtual machines 131 can be, for example, hardware emulation, full virtualization, para-virtualization, and operating system-level virtualization virtual machines. The guest OSes running on the virtual machines 131 can be of the same or different types (e.g., all may be Windows® operating systems, or some may be Windows operating systems and the others may be Linux® operating systems). Moreover, the guest OSes and the host OS may share the same operating system type, or the host OS may be a different type of OS than one or more guest OSes. For example, a guest OS may be a Windows operating system and a host OS may be a Linux operating system.

The clients 101 may include computing devices that have a wide range of processing capabilities. The clients 101 may access the virtual machines 131 over the network 102. In one scenario, each virtual machine 131 provides a virtual desktop for the client 101. From the user's point of view, the virtual desktop functions as a physical desktop (e.g., a personal computer) and is indistinguishable from a physical desktop. In an alternative network configuration (not shown), a client 101 may be a local client of the host 109, e.g., it is part of the host 102 and it communicates with the virtual machines 131 locally. For example, the host 109 may be a school computer that hosts client software and a virtual machine for each student that uses this school computer.

Each host 109 may have one or more installers 133 to install operating systems onto the virtual machines 131. An installer 133 may be used to install operating systems to run on a virtual machine or physical hardware. In one embodiment, each installer 133 may only be coupled to a single virtual machine 131 and may only install an operating system onto the single virtual machine. In another embodiment, an installer 133 may be coupled to multiple virtual machines 131 and may install an operating system of a specific type onto the multiple virtual machines 131. In a further embodiment, an installer 133 may be coupled to multiple virtual machines 131 and may install operating systems of different types onto the multiple virtual machines 131. In one embodiment, the installer may include one or more software modules which install an operating system (e.g., an installer file, a CD or DVD including an installer file, etc.). In one embodiment, the installer may execute within a virtual machine.

In one embodiment, when the installer 133 is invoked to install an operating system, the installer 133 detects a hypervisor 132 and causes configuration parameters of the operating system to be adjusted based on the hypervisor 132 such that the operating system will execute more efficiently and/or more optimally on the virtual machine 131. A configuration parameter of an operating system may comprise a setting, a property, a procedure, a protocol, an option, and a configuration (e.g., a plurality of settings and/or properties) of an operating system, which affects how the operating system executes and/or interfaces with hardware/software. One example of a configuration parameter is the procedure an operating system may use when writing data to a memory and/or disk. An operating system may cache data rather then write it directly to a disk, in order to minimize delays caused by writing data to a disk (e.g., delays caused by seek time). However, a virtual machine does not have a physical disk, and thus does not suffer from these delays. The procedure that the operating system uses for writing data to a disk may be changed such that data is written directly to disk and is not cached. The installer 133 may change this data writing procedure (e.g., configuration parameter) when the installer 133 detects the hypervisor and determines that the operating system is to be installed on a virtual machine 131, rather than a physical machine.

Other examples of configuration parameters may include, for example, Transfer Control Protocol (TCP) window sizes, generic network settings, block sizes for cache, memory, and/or disks, procedures for writing to or reading from cache, memory, and/or disks (e.g., first in first out (FIFO) algorithm, completely fair queuing (CFQ) algorithm, deadline algorithm, etc.), buffer sizes, display settings, settings for communication protocols used by the operating system, power saving settings (e.g., suspension/sleep mode of a machine), etc. It should be understood that a variety of configuration parameters are possible for various operating systems, and that the installer 133 may adjust any of such configuration parameters without loss of generality.

Configuration parameters for an operating system may be stored in a variety of locations. For example, for a Windows type operating system, configuration parameters may be stored in a registry or registry file of the operating system, and for a Linux type operating system, configuration parameters may be stored in various configuration files, or may be stored within the kernel of the operating system. In one embodiment, configuration parameters for the operating system (e.g., kernel parameters) may be set by passing command-line options at the time of start-up (e.g., at boot-time). In another embodiment, the operating system may use a boot loader and a configuration file to pass configuration parameters to the kernel of the operating system. The configuration parameters may be stored in the configuration file and may be used by the boot loader to boot the operating system. In a further embodiment, configuration parameters may be modified and/or updated by writing values to special files used by the operating system. For example, the "/proc/ sys/vm/swappines" file may be used to adjust how much free memory should be maintained by writing out memory pages to the swap space).

The installer 133 may ask a user whether the configuration parameters of the operating system should be adjusted according to the hypervisor 132 or may automatically, without any interaction with the user, trigger the adjustment of the configuration parameters of the operating system in accordance with the hypervisor 132. In one embodiment, the installer 133 may determine the type of the hypervisor (e.g., a KVM hypervisor) and may provide options which may enhance the operating system's behavior when running on the hypervisor. In another embodiment, the installer 133 may not be able to determine the type of the hypervisor and may provide options to set certain configuration parameters which may enhance the operating system's behavior, regardless of the type of the hypervisor. In a further embodiment, these options may be automatically applied or may be presented to an administrator who may enable or disable the options.

The configuration parameters may be adjusted by the installer 133 itself or by a service invoked by the installer 133. In one embodiment, the installer 133 may modify and/or update a configuration file used by a boot loader of an operating system, to set the configuration parameters. In another embodiment, the installer 133 may use a service (e.g., the ktune service) to set the configuration parameters and update and/or modify a configuration user by the service. In a further embodiment, the installer may also modify and/or update application-specific configuration parameters (e.g., parameters used by applications running on the operating system).

Figure 2A:
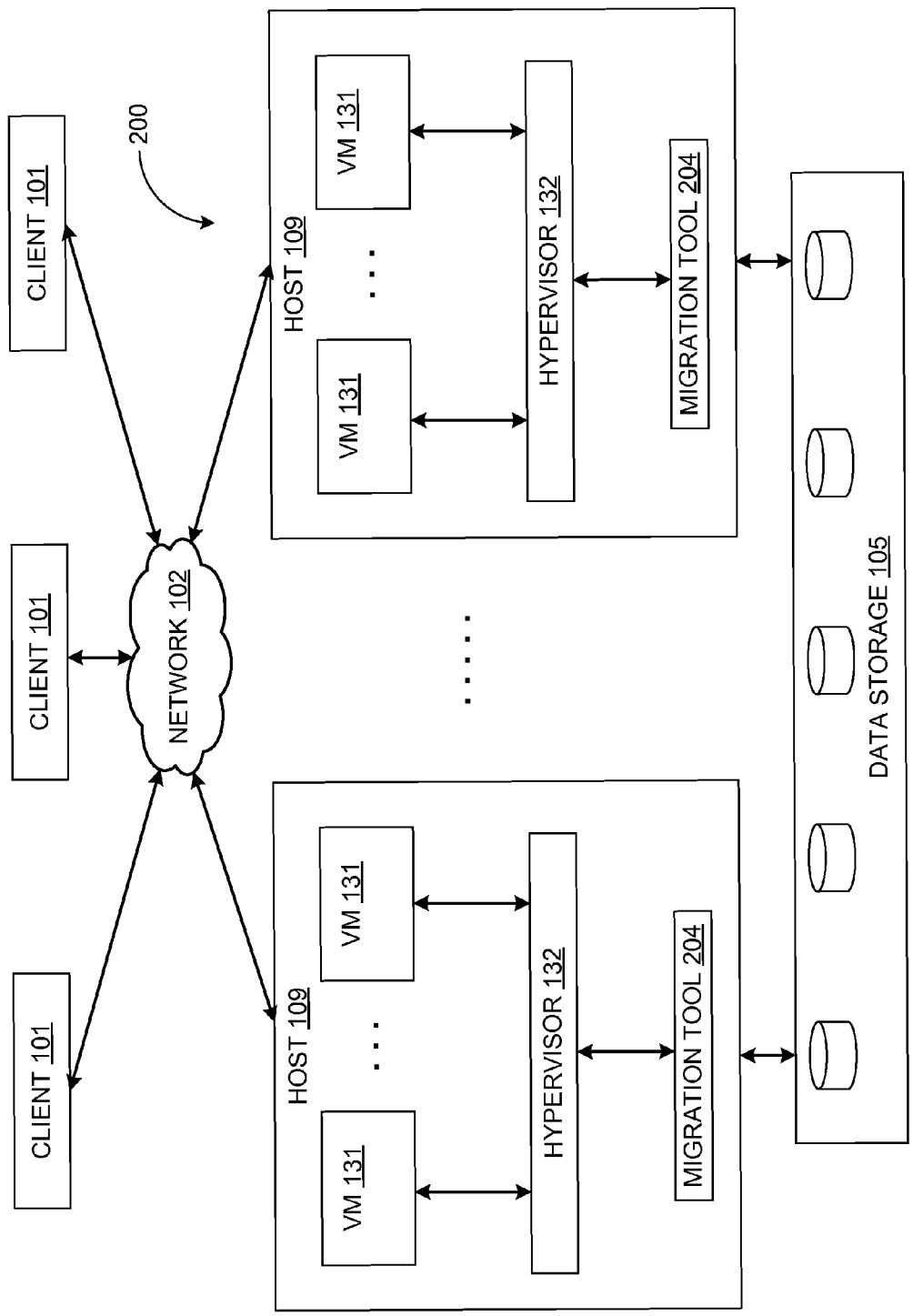
FIG. 2A is a block diagram of another exemplary network architecture in which embodiments of the invention may operate.

FIG. 2A is a block diagram of a second exemplary network architecture 200 in which embodiments of the invention may operate. The network architecture 200 may include hosts 109 coupled to one or more clients 101 over a network 102, similarly to network architecture 100 of FIG. 1.

Each host 109 may have a migration tool 204 that is responsible for migrating (e.g., copy and/or move) an operating system from a source host 109 to a target host 109, where the source and target hosts run hypervisors of different types. Alternatively, the migration tool 204 may migrate an operating system from a first virtual machine 131 running under a first hypervisor on a host 109 to a second virtual machine running under a second hypervisor on the same host 109 (not shown in FIG. 2A).

In one embodiment, the migration tool 204 may identify a guest operating system to be migrated, determine what hypervisor the guest operating system is currently running under and what hypervisor the guest operating system will be migrated to, and compare the two hypervisors. In one embodiment, a user, such as a system administrator, may provide input to the migration tool 204 to identify the two hypervisors. If the two hypervisors are different, the migration tool 204 adjusts configuration parameters (e.g., settings, options, configurations, etc.) of the guest operating system during the migration in accordance with the new hypervisor. In one embodiment, the migration tool may adjust configuration parameters when the two hypervisors are different. For example, in the previous hypervisor, the guest operating system may not have been adjusted and the migration tool 204 may adjust the guest operating system when it is migrated to the second hypervisor, which is of the same type as the first hypervisor.

As discussed above, a configuration parameter of an operating system may comprise a setting, a procedure, a protocol, and an option or a configuration of an operating system, which affects how the operating system executes and/or interfaces with hardware/software. It should be understood that a variety of configuration parameters are possible for various operating systems, and that in different embodiments, the migration tool 204 may change the variety of configuration parameters.

The migration tool 204 may ask a user whether the configuration parameters of the guest operating system should be adjusted according to the new hypervisor 132 or may automatically, without any interaction with the user, trigger the adjustment of the configuration parameters of the guest operating in accordance with the new hypervisor 132. The configuration parameters may be adjusted by the migration tool 204 itself or by a service invoked by the migration tool 204.

Figure 2B:
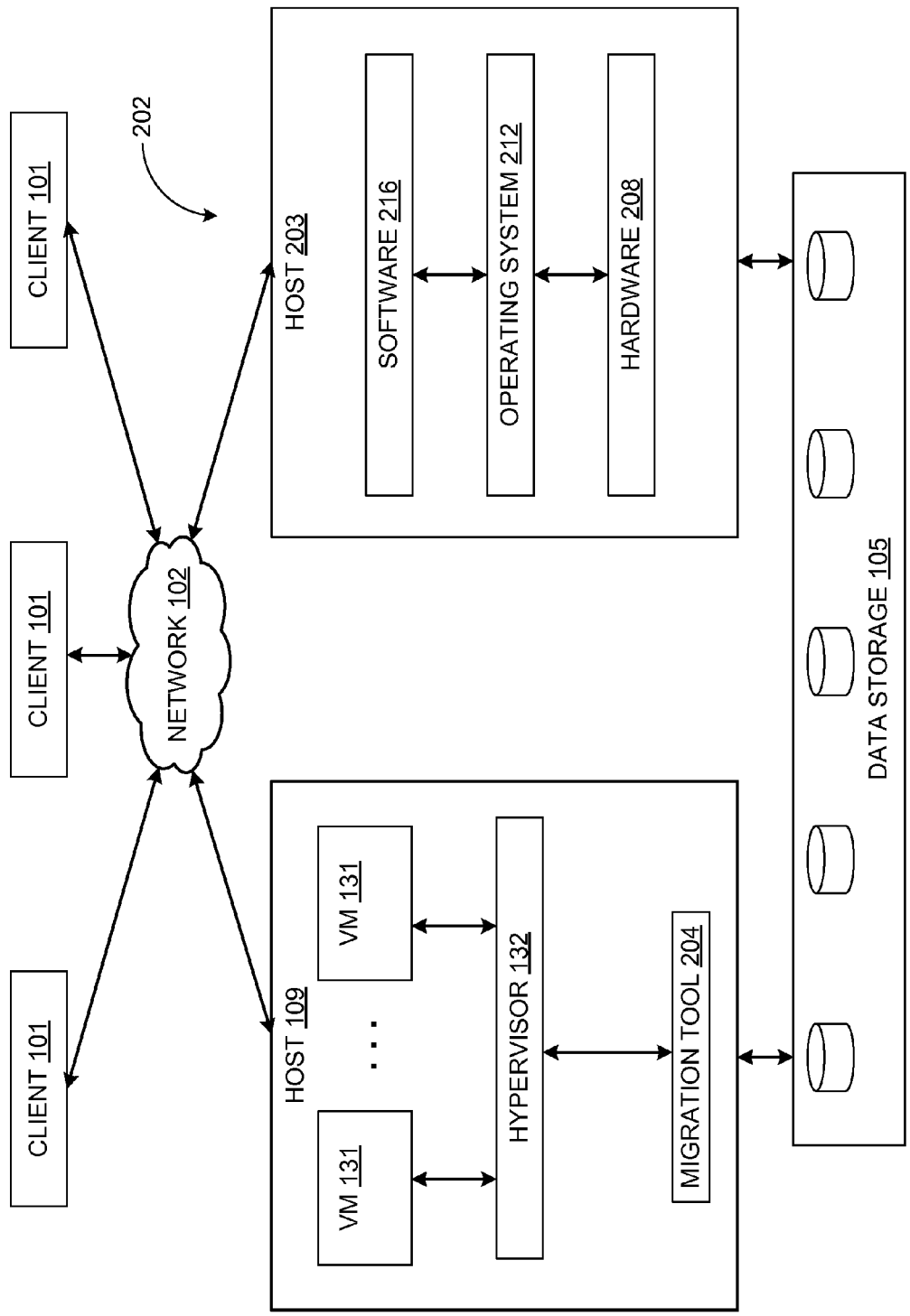
FIG. 2B is a block diagram of yet another exemplary network architecture in which embodiments of the invention may operate.

FIG. 2B is a block diagram of a third exemplary network architecture 202 in which embodiments of the invention may operate. The network architecture 202 includes a first host 109 (e.g., a host computer) and a second host 203, coupled to one or more clients 101 over a network 102. The network 102 may be a private network (e.g., a local area network (LAN), a wide area network (WAN), intranet, etc.) or a public network (e.g., the Internet). The hosts 109 and 203 are also coupled to data storage 105. The data storage 105 includes one or more mass storage devices (e.g., disks) which form a storage pool that may be share by the hosts 109 and 203.

The clients 101 may include computing devices that have a wide range of processing capabilities. The clients 101 may access the virtual machines 131 over the network 102. In one scenario, each virtual machine 131 provides a virtual desktop for the client 101. From the user's point of view, the virtual desktop functions as a physical desktop (e.g., a personal computer) and is indistinguishable from a physical desktop. The clients 101 may also be coupled to the host 203 via the network 102.

Host 203 is a physical computer system that includes an operating system 212 running on hardware 208 (e.g., video card, memory, processor, etc.). The operating system 212 may also interface with software 216 (e.g., applications, games, etc.) and may facilitate the use of the hardware 208 by the software 216 or may send data to and from the hardware 208 to the software 216.

Host 109 may be similar to host 109 of FIGS. 1 and 2A and may include one or more virtual machines 131, as discussed above with reference to FIGS. 1 and 2A. In one embodiment, the host 109 may include a migration tool 204 that is responsible for migrating an operating system 212 from the host 203 to the host 109 to run in a virtual machine 131.

In one embodiment, the migration tool 204 may identify the operating system 212 to be migrated and may determine that the operating system 212 will run under a hypervisor 132. In another embodiment, the migration tool 204 may determine that the hypervisor 132 is one of multiple types of hypervisors, and may adjust the operating system for a selected one of the multiple types of hypervisors. The migration tool 204 may adjust configuration parameters (e.g., settings, options, configurations, etc.) of the operating system 212 in accordance with the hypervisor 132 such that the operating system 212 will run more efficiently and/or more optimally under the hypervisor. In a further embodiment, the migration tool 204 may receive data and/or information about the hypervisor 132 (e.g., may receive information about the type of the hypervisor via message, configuration file, or from a user) and may adjust configuration parameters (e.g., settings, options, configurations, etc.) of the operating system 212 in accordance with the hypervisor 132 such that the operating system 212 will run more efficiently and/or more optimally under the hypervisor.

As discussed above, a configuration parameter of an operating system may comprise a setting, a parameter, a procedure, a protocol, an option or a configuration of an operating system, which affects how the operating system executes and/or interfaces with hardware/software. It should be understood that a variety of configuration parameters are possible for various operating systems, and that in different embodiments, the migration tool 204 may change and/or adjust the variety of configuration parameters.

Figure 3A:
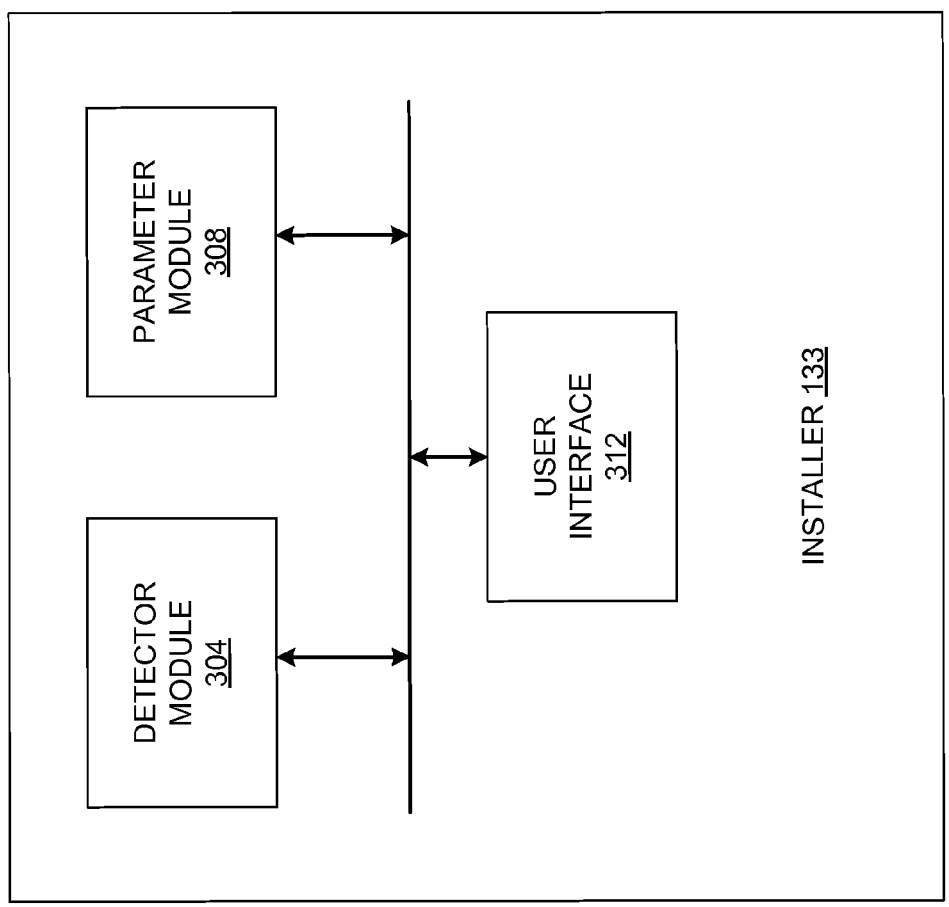
FIG. 3A is a block diagram illustrating one embodiment of an installer in the host computer of FIG. 1.

FIG. 3A is a block diagram illustrating one embodiment of an installer 133 in the host computer 109. The installer 133 may install a guest operating system onto a virtual machine 131. The installer 133 includes a detector module 304 to detect the hypervisor 132 of the host 109 or to determine that a guest operating system is to be installed on a virtual machine 131 running under the hypervisor 132. The detector module 304 is coupled to a parameter module 308 and a user interface 312.

The detector module 304 may use a variety of methods and techniques to detect a hypervisor 132 or to determine whether a guest operating system is to be installed on a virtual machine 131 running under a hypervisor 132. In one embodiment, the detector module 304 may determine the types of devices which are used by a virtual machine 131. If the detector module 304 detects a certain type of virtual device, then the detector module 304 may determine that the guest operating system is to be installed on a virtual machine 131 running under the hypervisor 132. In another embodiment, the detector module 304 may detect other attributes of the virtual machine (e.g., the name or location of the virtual machine) in order to determine whether the guest operating system is to be installed on a virtual machine 131 running under the hypervisor 132. In a further embodiment, the hypervisor 132 may communicate with the installer 133 (e.g., by sending and/or receiving messages) and the detector module 304 to allow the detector module 304 to detect the hypervisor 132 or determine whether the guest operating system is to be installed on a virtual machine 131 running under the hypervisor 132. In one embodiment, the detector module 304 may use an identification string for hardware, to determine whether the hardware is actual hardware or virtual hardware. For example, an actual processor may be identified as "GenuineIntel" but a virtual processor may be identified as "KVMKVMKVMKVM." In another embodiment the detector module 304 may detect the features supported by the hardware or the instruction set supported by the hardware, to determine whether the hardware is actual hardware or virtual hardware.

In one embodiment, the detector module 304 may determine the type of hypervisor 132 that the virtual machine 131 is running under. For example, the detector module 304 may determine that the virtual machine 131 is running under a Kernel-Based Virtual Machine (KVM) type hypervisor. In another embodiment, the hypervisor 132 may communicate with the detector module 304 (e.g., via a message or a flag) and provide data to the detector module 304 associated with the type of the hypervisor 132. In another embodiment, a guest may comprise one or more guest agents. The guest agents may be hypervisor specific agents, or a single agent which may be able to communicate with multiple hypervisors. The detector module 304 may communicate with the guest agent. The hypervisor may send messages to the agent and the agent may update and/or modify configuration parameters, based on the messages received from the hypervisor.

The installer 133 also includes a parameter module 308. The parameter module 308 may change and/or update the configuration parameters of an operating system which is to be installed onto a virtual machine 131. The parameter module 308 is coupled to a detector module 304 and optionally coupled to a user interface 312. As discussed above, the detector module 304 may detect the hypervisor 132 or determine that an operating system is to be installed on a virtual machine 131, rather than a physical machine. In one embodiment, the detector module 304 may inform the parameter module 308 (e.g., send a message, set a flag, etc.) that a hypervisor 132 has been detected or that the operating system is to be installed on the virtual machine 131. The parameter module 304 may change and/or adjust at least one configuration parameter of the operating system based on information received from the detector module 304.

In another embodiment, the parameter module 308 may change and/or adjust at least one configuration parameter of the operating system based on the type of hypervisor 132 or the virtual machine 131 detected by the detector module 304. For example, the detector module 304 may determine that the hypervisor 132 is a KVM type hypervisor. The parameter module 308 may obtain this information from the detector module 304 (e.g., through a message) and may set at least one configuration parameter of the operating system based on the detected KVM type hypervisor 132 such that the operating system may operate more efficiently under the detected KVM type hypervisor 132.

In one embodiment, the parameter module 308 may operate in conjunction with a user interface 312 to set at least one configuration parameter, as described below in conjunction with FIG. 5. In one embodiment, the parameter module 308 may enable a service configured to set at least one configuration parameter based on the hypervisor 132, as described below in conjunction with FIG. 6. In another embodiment, the parameter module 308 may update a configuration file using a value (e.g., an optimal value) for at least one configuration parameter, based on the hypervisor 132, as described below in conjunction with FIG. 7. In yet another embodiment, the parameter module 308 may directly adjust and/or change a setting within the guest operating system, as described below in conjunction with FIG. 7. In one embodiment, the parameter module 308 may update at least one configuration parameter to a value that is acceptable for multiple types of hypervisors. For example, the parameter module 308 may set a TCP window size to a generic value that is commonly used by a different types of guest OSes and different hypervisors.

The installer 133 further includes a user interface 312. The user interface may facilitate user input as to whether at least one configuration parameter should be adjusted. The user interface 312 is coupled to the identifying module 304 and the parameter module 308. In one embodiment, the parameter module 308 may operate in conjunction with user interface 312 when setting at least one configuration parameter of the guest operating system. For example, the parameter module 308 may provide data to and/or receive data from a user interface 312. The parameter module 308 may change at least one configuration parameter based, at least in part on, data received from the user interface 312 (e.g., based on input received from a user).

Figure 10:
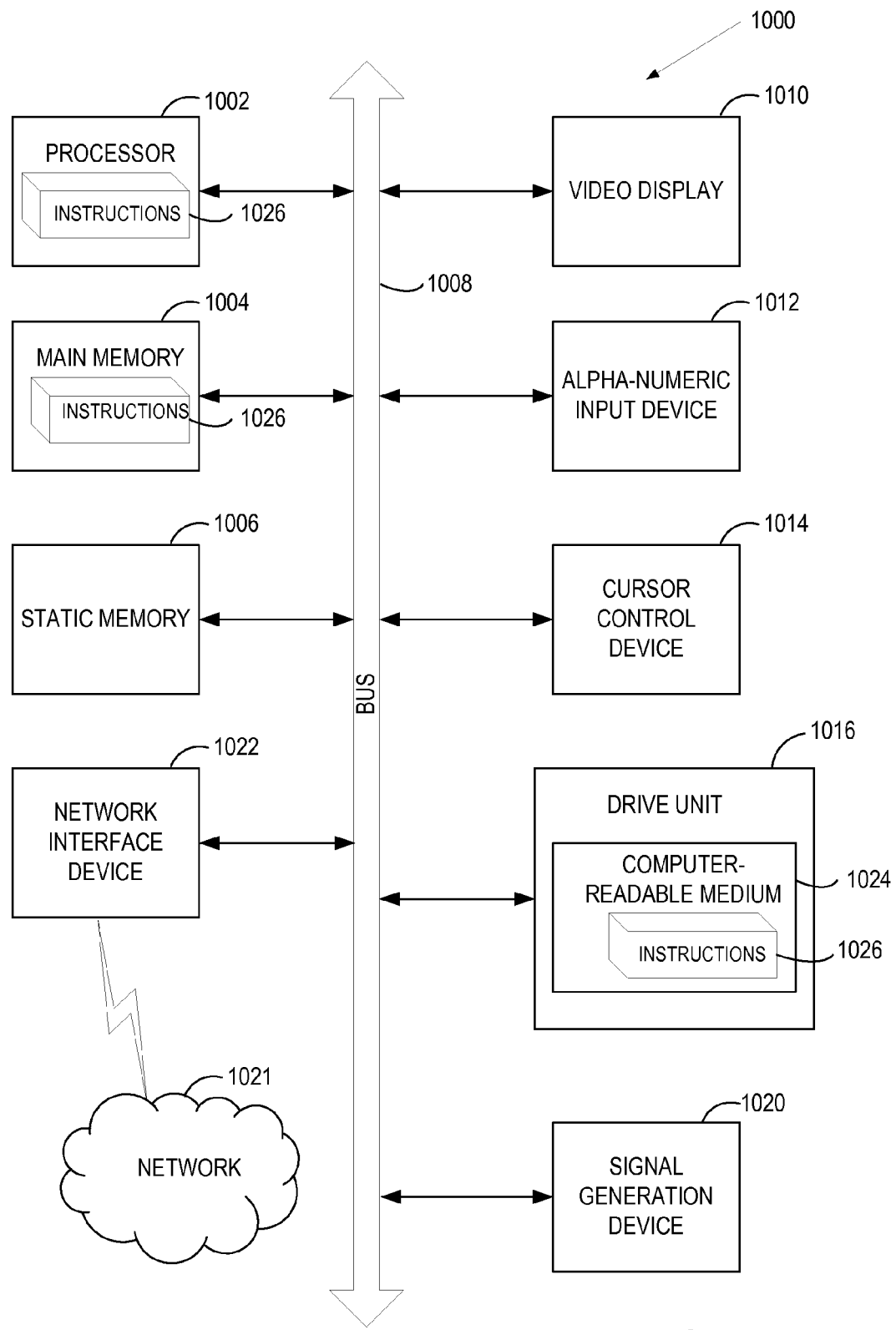
FIG. 10 illustrates one embodiment of a system for adjusting an operating system according to a hypervisor.

In one embodiment, the user interface 312 may comprise a graphical user interface. For example, the user interface 312 may include, but is not limited to, a check box, a drop down menu, a text field, a button, a command line, text, graphics, video, multimedia, and other components which may convey information to a user and/or accept input from a user. In another embodiment, the user interface 312 may be displayed to a user on a video display 1010 of a computer system 1000, as shown in FIG. 10. A user may use one or more of alphanumeric device 1012 and cursor control device 1014 to provide user input to the user interface 312.

Figure 3B:
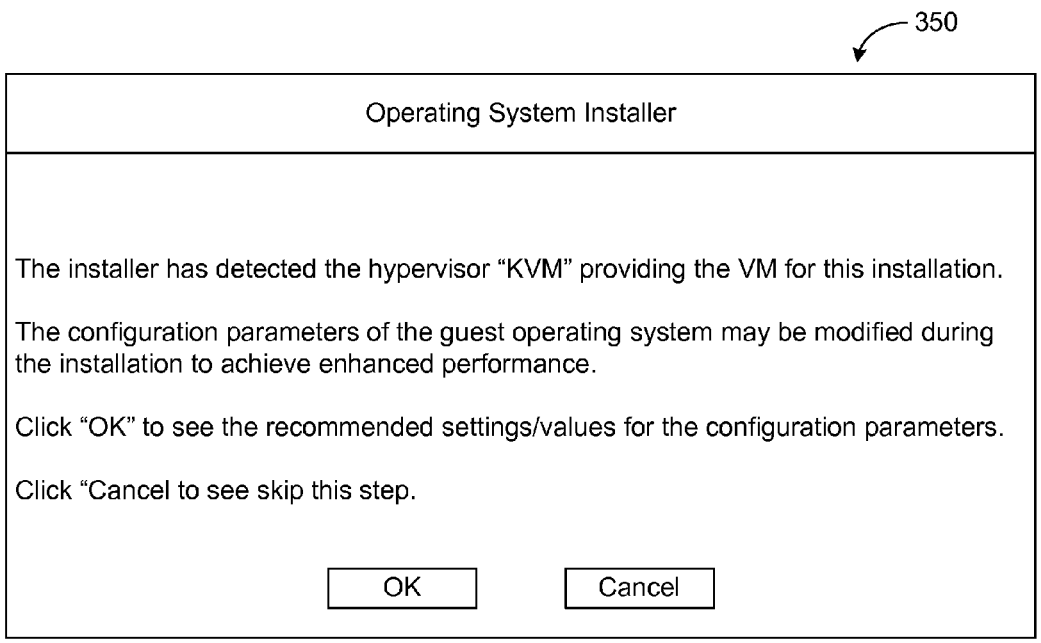
FIGS. 3B-3E are exemplary screenshots of an installer according to certain embodiments.

FIG. 3B is an exemplary screenshot of an installer 350, according to one embodiment. As shown in FIG. 3B, the installer 350 provides a user (e.g., a system administrator) with the option of setting configuration parameters for an operating system for a hypervisor type (e.g., KVM) or skipping the setting of the configuration parameters. If the user selects the "Cancel" button, the installer 350 will install the operating system onto the virtual machine without setting configuration parameters to enhance the performance of the operating system under the hypervisor. If the user selects the "OK" button, the installer provides settings and configuration parameter options which may be configured to enhance the performance of the operating system under the hypervisor. The installer 350 also provides "Back" and "Next" buttons which allow the user to access the previous or next set of configuration parameters.

Figure 3C:
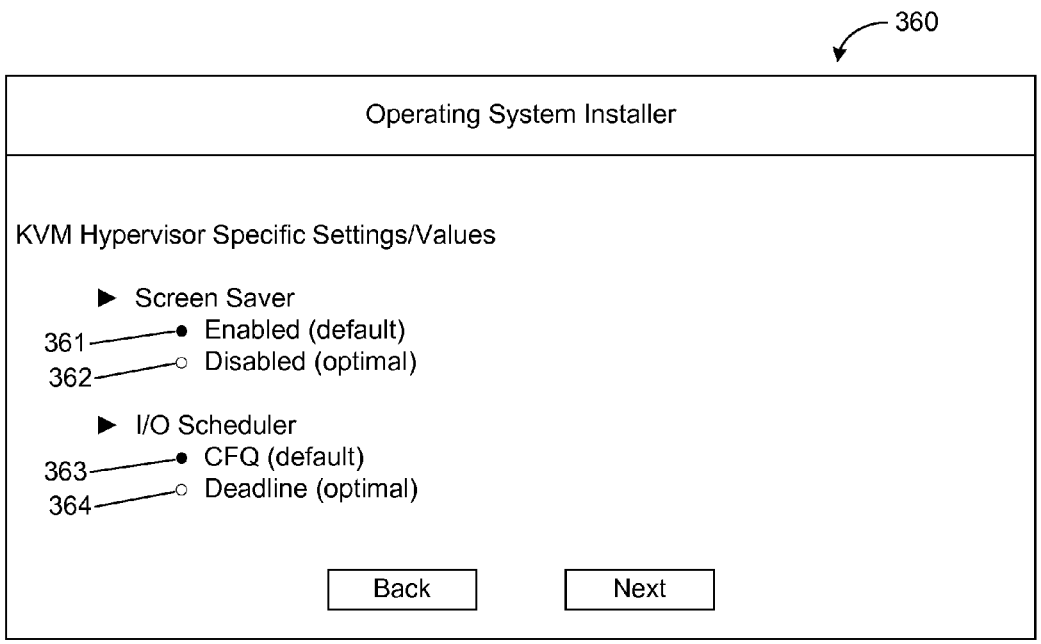

FIG. 3C is an exemplary screenshot of an installer 360, according to another embodiment. As shown in FIG. 3C, the installer 360 provides the user with the ability to set configuration parameters to enhance the performance of the operating system under the hypervisor. The installer 360 comprises radio buttons 361-364 which allow the user to select options and/or values for configuration parameters of the operating system. For example, under the Screen Saver section, the configuration parameter controlling the screen saver is set to "Enabled" which is the default option. The user may select the radio button 362 labeled "Disabled" in order to disable the screen saver and enhance the operation of the operating system running under the hypervisor. The installer 360 also provides "Back" and "Next" buttons which allow the user to access the previous or next set of configuration parameters.

Figure 3D:
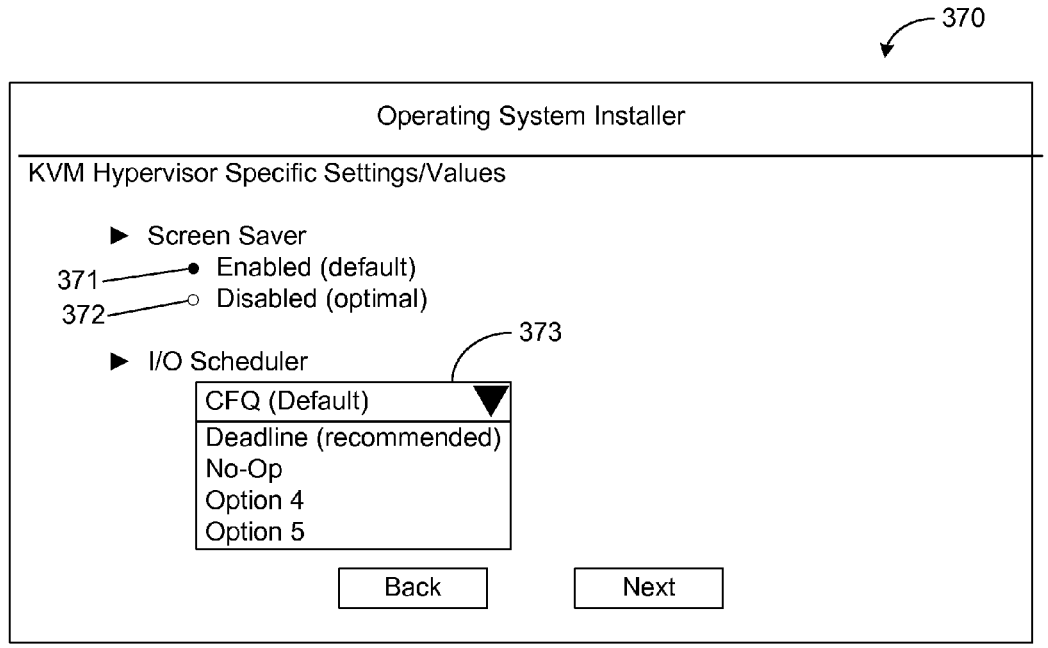

FIG. 3D is an exemplary screenshot of an installer 370, according to a further embodiment. As shown in FIG. 3D, the installer 370 provides the user with the ability to set configuration parameters to enhance the performance of the operating system under the hypervisor. The installer 370 comprises radio buttons 371, 372, and drop down menu 373 which allow the user to select options and/or values for configuration parameters of the operating system. For example, under the I/O Scheduling section, the drop down menu 373 provides multiple options for setting the I/O scheduling configuration parameter (e.g., CFQ, Deadline, etc.). The user may select the "Deadline" scheduling option to enhance the operation of the operating system running under the hypervisor. The installer 370 also provides "Back" and "Next" buttons which allow the user to access the previous or next set of configuration parameters.

Figure 3E:
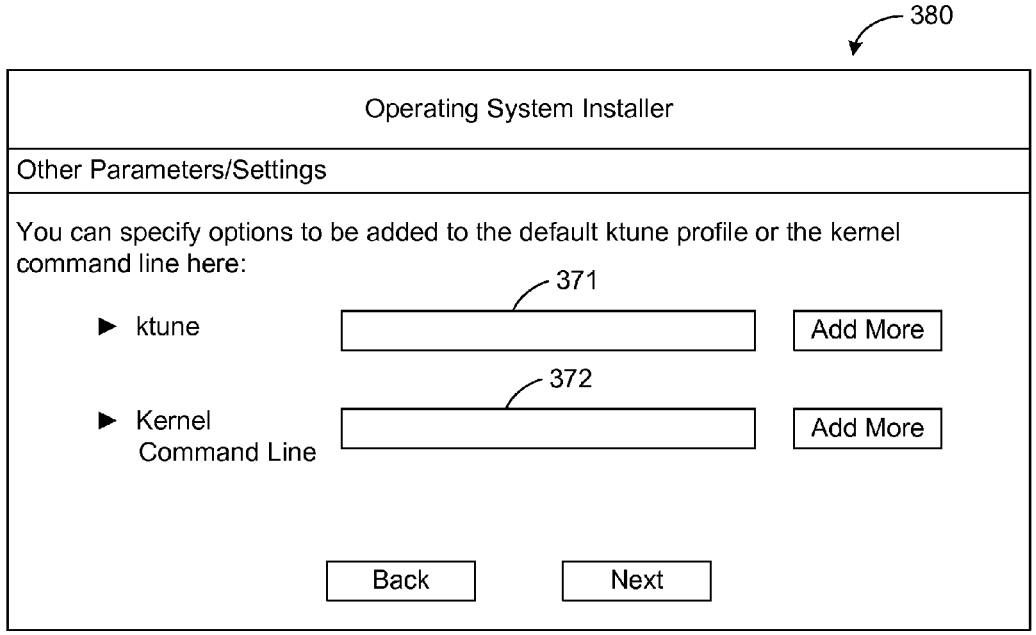

FIG. 3E is an exemplary screenshot of an installer 380 according to one embodiment. As shown in FIG. 3E, the installer 380 provides the user with the ability to set configuration parameters to enhance the performance of the operating system under the hypervisor. The user may use text fields 381 and 382 to add or update configuration settings used by ktune and/or the kernel command line interface. The "Add More" buttons may be used to add ktune settings/parameters and/or kernel command line settings/parameters which were entered into the text fields 381 and/or 382. The installer 380 also provides "Back" and "Next" buttons which allow the user to access the previous or next set of configuration parameters.

Figure 4:
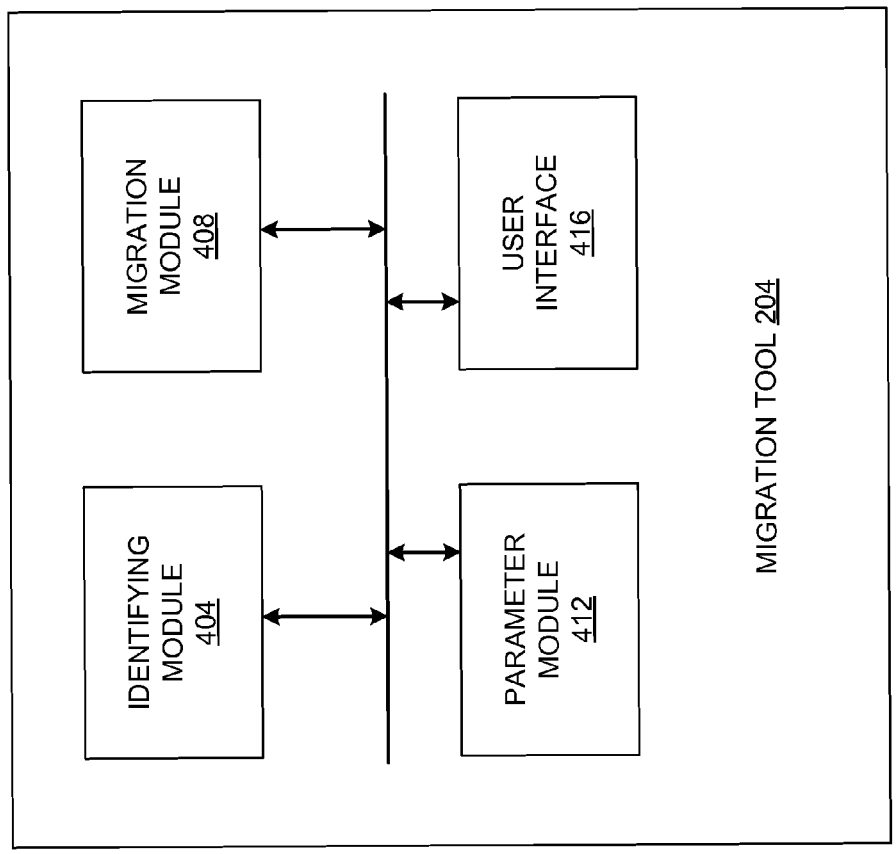
FIG. 4 is a block diagram illustrating one embodiment of a migration tool in the host computers of FIGS. 2A and 2B.

FIG. 4 is a block diagram illustrating one embodiment of a migration tool 204 in a host computer 109. The migration tool 204 includes an identifying module 404 which may identify an operating system to be migrated to a virtual machine 131 on a host 109. For example, the identifying module 404 may identify an operating system as a Windows® type operating system. The identifying module 404 may also identify the type of the hypervisor 132 that the operating system is to be migrated to. The identifying module 404 is coupled to a migration module 408, a parameter module 412 and a user interface 416.

The identifying module 404 may use a variety of methods and techniques to identify the hypervisor 132. In one embodiment, the hypervisor 132 may communicate with the migration tool 204 (e.g., by sending and/or receiving messages) and the identifying module 404 to allow the identifying module 404 to determine the type of the hypervisor 132.

In one embodiment, the identifying module 404 may determine the type of hypervisor 132 that guest operating system is to be migrated to. For example, the identifying module 404 may determine that the hypervisor 132 is a KVM type hypervisor. In another embodiment, the hypervisor 132 may communicate with the identifying module 404 (e.g., via a message or a flag) and provide data to the identifying module 404 associated with the type of the hypervisor 132.

The migration tool 204 also includes a migration module 408. In one embodiment, the migration module 408 may migrate an operating system executing on the virtual machine 131 under a first hypervisor 132 on a first host 109, to a second hypervisor 132 on a second host 109. For example, the migration module 408 may transfer the virtual machine 131 from the first hypervisor 132 to the second hypervisor 132. In another embodiment, the migration module 408 may migrate an operating system running on a physical machine such as host 203 (e.g., a machine with real hardware) to a virtual machine 131 on a host 109. For example, the migration module 408 may create a virtual machine 131 on a target host system 109 (e.g., the host that the operating system is to be migrated to). The migration module 408 may then create an image of the physical machine (e.g., host 203) and add the image of the physical machine to the virtual machine 131 created on the target host system 109. It should be understood that a variety of methods and techniques may be used to migrate a virtual machine from one hypervisor to another, or to migrate a physical machine to a virtual machine, and that in different embodiments, the migration module 408 may use these other methods and techniques.

The migration tool 204 also includes a parameter module 412. The parameter module 412 may change and/or update the configuration parameters of an operating system which is to be migrated to a virtual machine 131. The parameter module 412 is coupled to the migration module 408, an identifying module 404 and a user interface 416. As discussed above, the identifying module 404 may detect the hypervisor 132 that an operating system is to be migrated to. In one embodiment, the identifying module 404 may inform the parameter module 412 (e.g., send a message, set a flag, etc.) that an operating system is to be migrated to a certain type of hypervisor. The parameter module 304 may change and/or adjust at least one configuration parameter of the operating system based on information received from the identifying module 404. For example, the identifying module 404 may determine that the hypervisor 132 is a KVM type hypervisor. The parameter module 412 may obtain this information from the identifying module 404 (e.g., through a message) and may set at least one configuration parameter of the operating system based on the detected KVM type hypervisor 132.

In one embodiment, the parameter module 412 may change and/or adjust at least one configuration parameter of an operating system at various times during the migration of the operating system to a virtual machine 131 running under the hypervisor 132. For example, the parameter module 412 may change and/or adjust at least one configuration parameter of a operating system before, during, and/or after the operating system is migrated to a hypervisor 132.

In one embodiment, the parameter module 412 may operate in conjunction with a user interface 416 to set at least one configuration parameter. In one embodiment, the parameter module 412 may enable a service configured to set at least one configuration parameter based on the hypervisor 132. In another embodiment, the parameter module 412 may update a configuration file using a value (e.g., an optimal value) for at least one configuration parameter, based on the hypervisor 132. In yet another embodiment, the parameter module 412 may directly adjust and/or change a setting within the guest operating system.

The migration tool 204 further includes a user interface 416. The user interface may facilitate user input as to whether at least one configuration parameter should be adjusted. The user interface 416 is coupled to the identifying module 404, the migration module 408, and the parameter module 412. In one embodiment, the parameter module 412 may operating in conjunction with user interface 416 when setting at least one configuration parameter of the guest operating system. For example, the parameter module 412 may provide data to and/or receive data from a user interface 416. The parameter module 412 may change at least one configuration parameter based, at least in part on, data received from the user interface 416.

In one embodiment, the user interface 416 may comprise a graphical user interface. For example, the user interface 416 may include, but is not limited to, a check box, a drop down menu, a text field, a button, a command line, text, graphics, video, multimedia, and other components which may convey information to a user and/or accept input from a user. In another embodiment, the user interface 416 may be displayed to a user on a video display 1010 of a computer system 1000, as shown in FIG. 10. A user may use one or more of alphanumeric device 1012 and cursor control device 1014 to provide user input to the user interface 416.

In one embodiment, the migration tool 204 may provide a user interface similar to the exemplary screenshots shown in FIGS. 3B-3E, and as discussed above.

Figure 5:
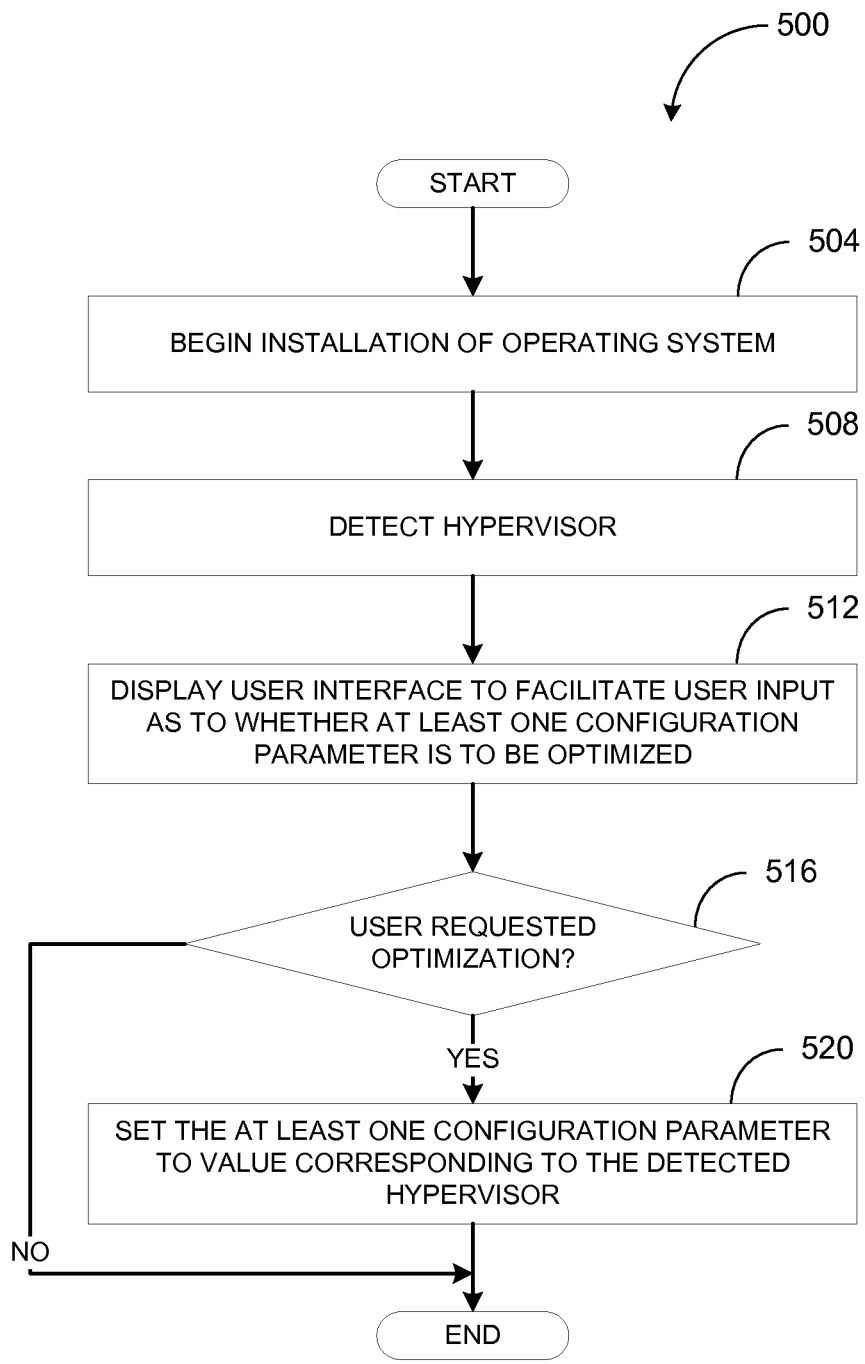
FIG. 5 is a flow diagram illustrating a method of adjusting an operating system for a hypervisor during an installation, according to one embodiment.

FIG. 5 is a flow diagram illustrating a method of adjusting an operating system for a hypervisor during an installation, according to a first embodiment. The method 500 may be performed by a computer system 1000 of FIG. 10 that may comprise hardware (e.g., circuitry, dedicated logic, programmable logic, microcode, etc.), software (e.g., instructions run on a processing device), or a combination thereof. In one embodiment, the method 500 is performed by the installer 133 (FIG. 1).

Referring to FIG. 5, the method 500 starts when the installer 133 begins the installation of an operating system onto a virtual machine 131 running under a hypervisor 132 (block 504) on host 109. During the installation, the installer 133 may detect the hypervisor 132 (block 508). The installer 133 may use the detector module 304 to detect the hypervisor 132. The installer 133 may also detect the type of the hypervisor 132. For example, the installer 133 may determine that the hypervisor 132 is a KVM type hypervisor.

The installer 133 may then display a user interface 312 to facilitate user input as to whether at least one configuration parameter of the operating system is to be adjusted (block 512). The installer may use the parameter module 308 and the user interface 312 to facilitate user input. For example, the detector module 304 may detect the type of the hypervisor 132 and provide this information to the parameter module 304 (e.g., via a message). The parameter module 304 may use the user interface 312 to display at least one configuration parameter to be changed and/or adjusted based on the detected hypervisor 132, to a user.

At block 516, the installer 133 checks whether the user has requested changes and/or adjustments in at least one configuration parameter of the operating system. For example, the installer 133 may check whether user input was received from a user via the user interface 312. If no changes and/or adjustments in at least one configuration parameter were requested by the users, the method 500 ends. If a user requests changes and/or adjustments to at least one configuration parameter of the operating system, the method 500 proceeds to block 520 where the installer 133 sets at least one configuration parameter to a value (e.g., an optimal value or a desired value) corresponding to the detected hypervisor 132. For example, the installer 133 may use the parameter module 308 to set a configuration parameter (e.g., protocol for writing to disk) to a certain value (e.g., directly write to disk without caching) based on the hypervisor 132 detected by the detector module 304.

In one embodiment, the user interface displayed in block 512 may allow a user to specify values for one or more configuration parameters. For example, the user interface may comprise a plurality of labeled text fields (e.g., one text field per configuration parameter) which accept input values from a user. The installer 133 may provide default values for the one or more configuration parameters in the text fields. In another embodiment, the user interface displayed may comprise a check box and/or a button and text asking a user whether configuration parameters should be changed and/or adjusted. The installer 133 may automatically obtain values for the configuration parameters once a user requests the changes and/or adjustments. In one embodiment, the default and/or automatically obtained values may be stored in a memory (e.g., main memory 1004) or medium (computer-readable medium 1024). In another embodiment, different default and/or automatically obtained values for the configuration parameters may be stored for different types of hypervisors.

After setting at least one configuration parameter to a value (e.g., an optimal value or a desired value) corresponding to the detected hypervisor 132 (block 520), the process 500 ends.

Figure 6:
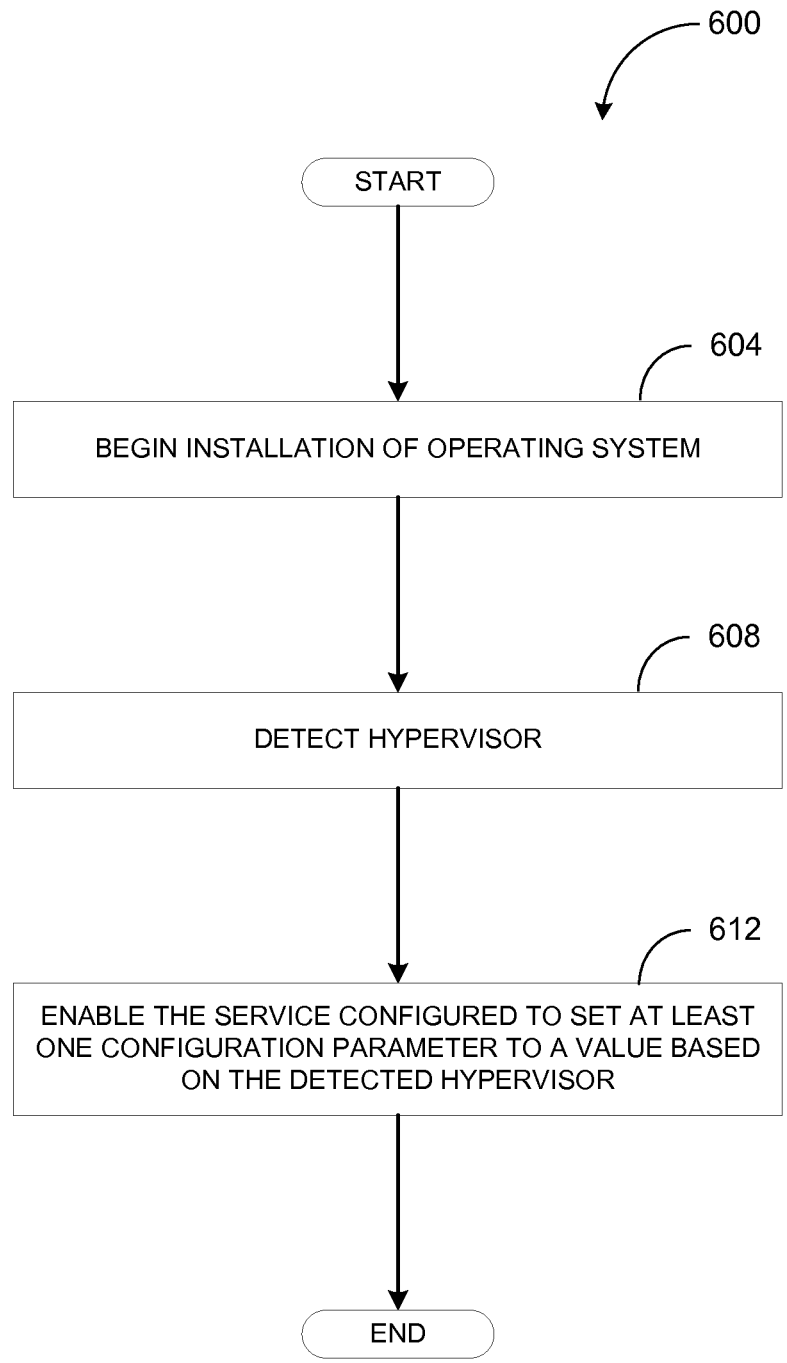
FIG. 6 is a flow diagram illustrating a method of adjusting an operating system for a hypervisor during an installation, according to another embodiment.

FIG. 6 is a flow diagram illustrating a method of adjusting an operating system for a hypervisor during an installation, according to a second embodiment. The method 600 may be performed by a computer system 1000 of FIG. 10 that may comprise hardware (e.g., circuitry, dedicated logic, programmable logic, microcode, etc.), software (e.g., instructions run on a processing device), or a combination thereof. In one embodiment, the method 600 is performed by the installer 133 (FIG. 1).

Referring to FIG. 6, the method 600 starts when the installer 133 begins the installation of an operating system onto a virtual machine 131 running under a hypervisor 132 (block 604) on host 109. During the installation, the installer 133 may detect the hypervisor 132 (block 608). The installer 133 may use the detector module 304 to detect the hypervisor 132. The installer 133 may also detect the type of the hypervisor 132.

At block 612, the installer 133 may enable a service configured to set a least one configuration parameter to a value (e.g., an optimal value) based on the hypervisor 132 detected by the detector module 304. The installer 133 may use the parameter module 308 to enable the service. In one embodiment, the service is enabled after the installation (e.g., after the guest operating system boots). In another embodiment the service can be started during the installation of the guest operating system. The service may modify the behavior of the operating system (e.g., by setting parameters such as TCP window sizes, IO scheduling, etc.). In one embodiment, the service may comprise a start-up service (e.g., a daemon) within the operating system which may set at least one configuration parameter to a value based on the detected hypervisor 132. For example, a start up service may be enabled which sets a configuration parameter (e.g., a TCP window size) to a certain value (e.g., 256) when the operating system begins execution (e.g., starts up or boots). In another embodiment, the service may comprise a process running within the operating system which may set at least one configuration parameter to a value based on the detected hypervisor 132. As discussed above, the values for the configuration parameters may be stored in a memory and/or medium and different values for the configuration parameters may be stored for different types of hypervisors. It should be understood that operating systems may use a variety of services or processes to set configuration parameters, and that in other embodiments, the parameter module 308 may use these other services or processes.

In one embodiment, the setting of the configuration parameters may be performed during a "pre-install" stage (e.g., before copying files to the virtual disk on the virtual machine). In another embodiment, the setting of the configuration parameters may be performed during a "post-install" stage (e.g., after the installation of the operating system has finished and the guest operating system is booted). The setting of the configuration parameters may be performed with other post-install tasks such as setting system time, time zone, creating new users, and setting parameters for applications to enhance the operation of the applications.

Figure 7:
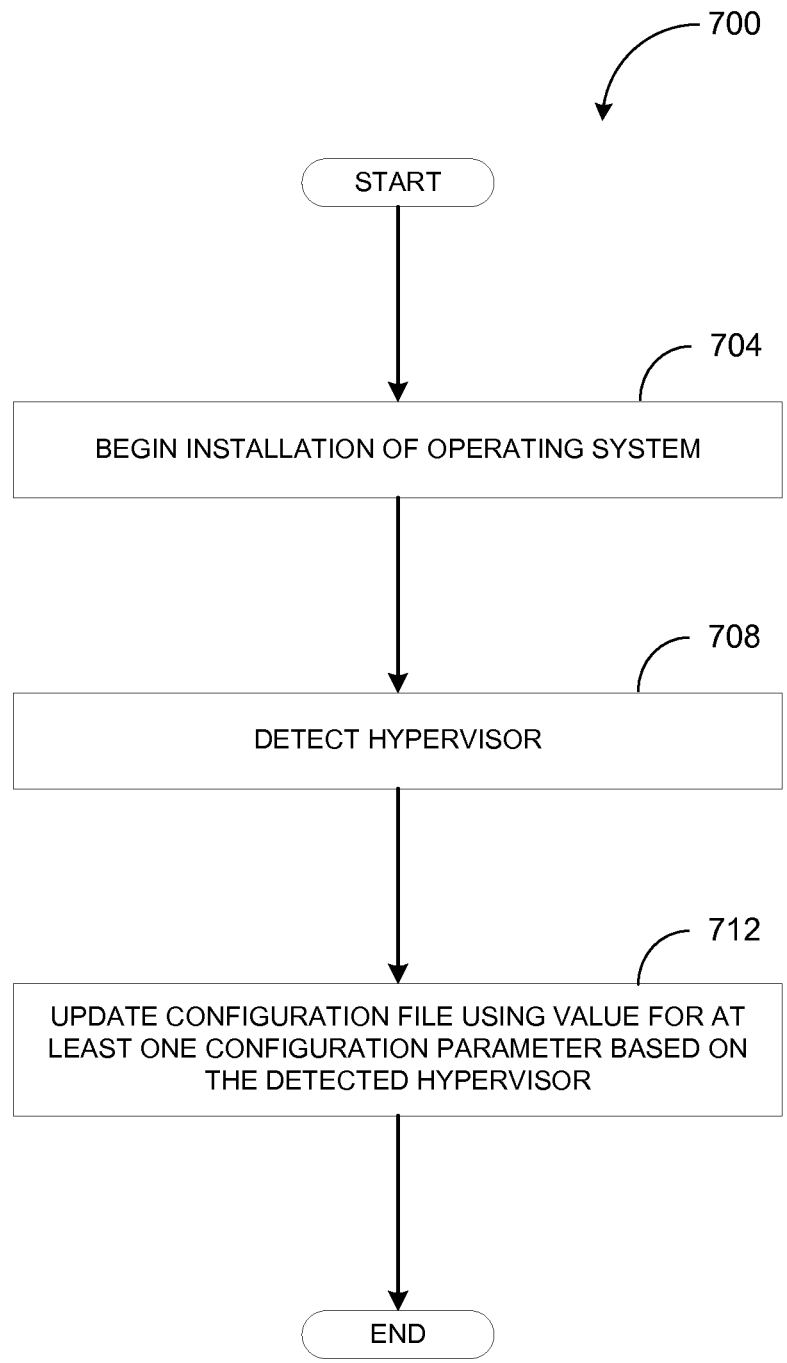
FIG. 7 is a flow diagram illustrating a method of adjusting an operating system for a hypervisor during an installation, according to yet another embodiment.

FIG. 7 is a flow diagram illustrating a method of adjusting an operating system for a hypervisor during an installation, according to a third embodiment. The method 700 may be performed by a computer system 1000 of FIG. 10 that may comprise hardware (e.g., circuitry, dedicated logic, programmable logic, microcode, etc.), software (e.g., instructions run on a processing device), or a combination thereof. In one embodiment, the method 700 is performed by the installer 133 (FIG. 1).

Referring to FIG. 7, the method 700 starts when the installer 133 begins the installation of an operating system onto a virtual machine 131 running under a hypervisor 132 (block 704) on host 109. During the installation, the installer 133 may detect the hypervisor 132 (block 708). The installer 133 may use the detector module 304 to detect the hypervisor 132. The installer 133 may also detect the type of the hypervisor 132.

At block 712, the installer 133 may update a configuration file using a value (e.g., an optimal value) for at least one configuration parameter based on the hypervisor 132 detected by the detector module 304. The installer 133 may use the parameter module 308 to update the configuration file. The configuration file may be used by an operating system to set configuration parameters to certain values when the operating system starts (e.g., boots up). In one embodiment, the configuration file may be used by a service (e.g., the "ktune" service) which sets configurations parameters to the value specified in the configuration file. In another embodiment, different configuration files may be updated for different types of hypervisors which are detected by the detector module 304.

In another embodiment not shown in the figures, the installer 133 may directly set the configuration parameters to a value based on the hypervisor 132 detected by the detector module 304. For example, for a Windows® operating system, the installer 133 may set registry settings (e.g., configuration parameters) to certain values based on the hypervisor 132. In another example, for a Linux® operating system, the installer 133 may set configurations parameters within the kernel of the operating system to certain values, based on the hypervisor 132. It should be understood that different methods and techniques may be used to directly set configuration parameters for an operating system, and that in some embodiments, the parameter module 308 may use these different methods and techniques.

After updating the configuration file using a value (e.g., an optimal value) based on the hypervisor 132 (block 712) or setting at least one configuration parameter to a value, the process 700 ends.

Figure 8:
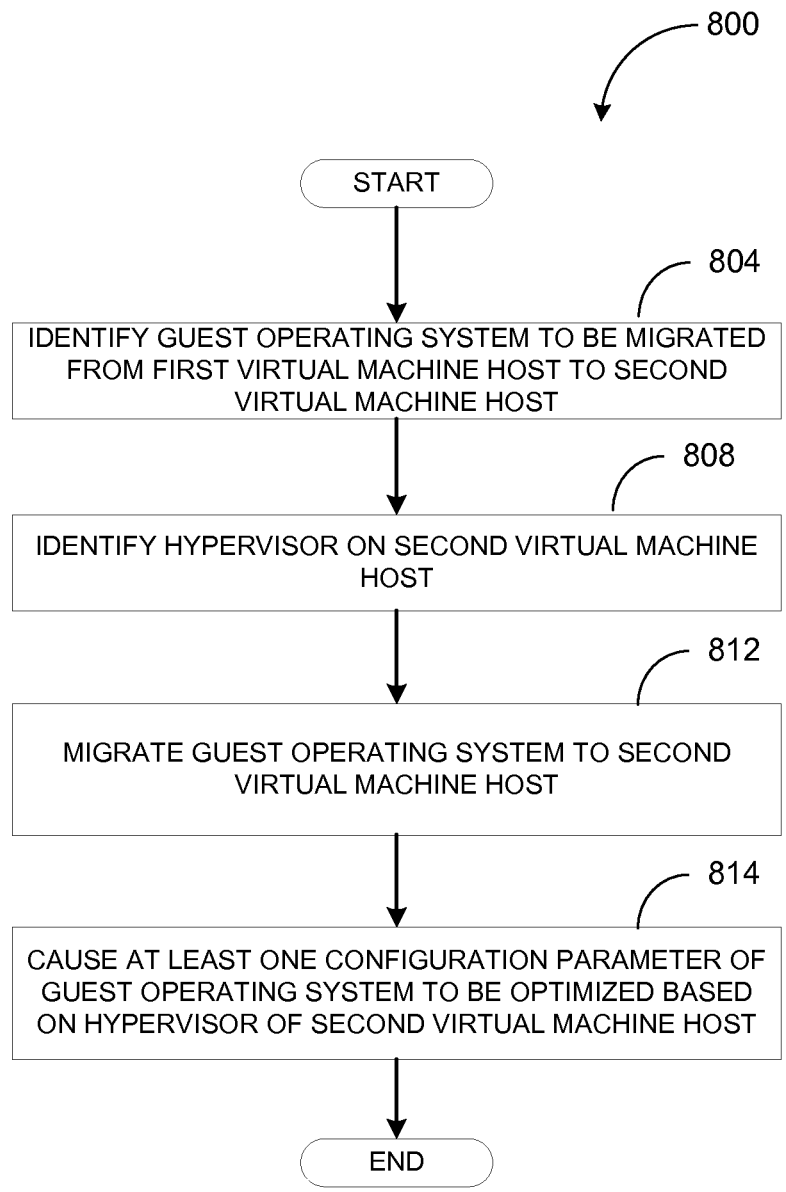
FIG. 8 is a flow diagram illustrating a method of adjusting a guest operating system for a hypervisor when the guest operating system is migrated from a first virtual machine host to a second virtual machine host, according to one embodiment.

FIG. 8 is a flow diagram illustrating a method of adjusting a guest operating system for a hypervisor during a migration, according to a first embodiment. The method 800 may be performed by a computer system 1000 of FIG. 10 that may comprise hardware (e.g., circuitry, dedicated logic, programmable logic, microcode, etc.), software (e.g., instructions run on a processing device), or a combination thereof. In one embodiment, the method 800 is performed by the migration tool 204 (FIGS. 2A and 2B).

Referring to FIG. 8, the method 800 starts when the migration tool 204 begins identifying a guest operating system to be migrated from a first virtual machine host to a second virtual machine host (block 804). The migration tool 204 may use the migration module 408 to identify a guest operating system, as discussed above in conjunction with FIG. 4. The migration tool 204 may then identify and/or detect the hypervisor on the second virtual machine host (block 808). The migration tool 204 may use the identifying module 404 to identify and/or detect the hypervisor. The migration tool 204 may also identify and/or detect the type of the hypervisor 132 and/or the type of the guest operating system. For example, the migration tool 204 may determine that the hypervisor is a KVM type hypervisor and that the guest operating system is a Windows® type operating system.

At block 812, the migration tool 204 migrates the guest operating system executing on the virtual machine under the first hypervisor on the first host to the second hypervisor on the second host. At block 814, the migration tool 204 causes at least one configuration parameter of the guest operating system to be adjusted based on the second hypervisor on the second host. For example, the migration tool 204 may determine that the second hypervisor is a KVM type hypervisor by requesting this information from the second hypervisor or by reading configuration data from a data store maintained by the second hypervisor or the second host, and may set at least one configuration parameter of the guest operating system based on the detected KVM type hypervisor.

In one embodiment, the migration tool 204 may change and/or adjust at least one configuration parameter of the guest operating system at various times during migration. For example, the migration tool may change and/or adjust the configuration parameter before, during, and/or after the guest operating system is migrated to the second hypervisor. The migration tool 204 may use a service configured to set the configuration parameters based on the second hypervisor. In another embodiment, the migration tool 204 may update a configuration file using a value (e.g., an optimal value) for at least one configuration parameter, based on user input (e.g., via graphical user interface) or automatically determine an optimal value for the at least one configuration parameter. For example, the migration tool 204 may automatically disable the sleep feature of the operating system (e.g., suspending to ram) because this feature is ineffective or sub-optimal on a virtual machine. In one embodiment, the migration tool 204 may set the configuration values to sub-optimal values by default, due to policies or procedures which are set by the user. For example, the user may have a company policy of setting the sleep feature to a time of 30 minutes, because this is a company-wide policy in order to conserve energy, regardless of whether the operating system is installed on a virtual machine (for which the sleep feature is ineffective) or an actual physical machine (which would actually use the sleep feature). In yet another embodiment, the parameter module 412 may directly adjust and/or change a setting within the guest operating system.

In one embodiment, prior to performing block 814, the migration tool 204 checks whether the user has requested changes and/or adjustments in at least one configuration parameter of the operating system. For example, the migration tool 204 may check whether user input was received from a user via the user interface. If no changes and/or adjustments in at least one configuration parameter were requested by the users, the migration tool 204 does not perform block 814. If a user requests changes and/or adjustments to at least one configuration parameter of the operating system, the method 800 proceeds to block 814. In another embodiment, the migration tool may be aware of previous adjustments made for a previous hypervisor, and can undo them or modify them with different adjustments at the time of migration.

Figure 9:
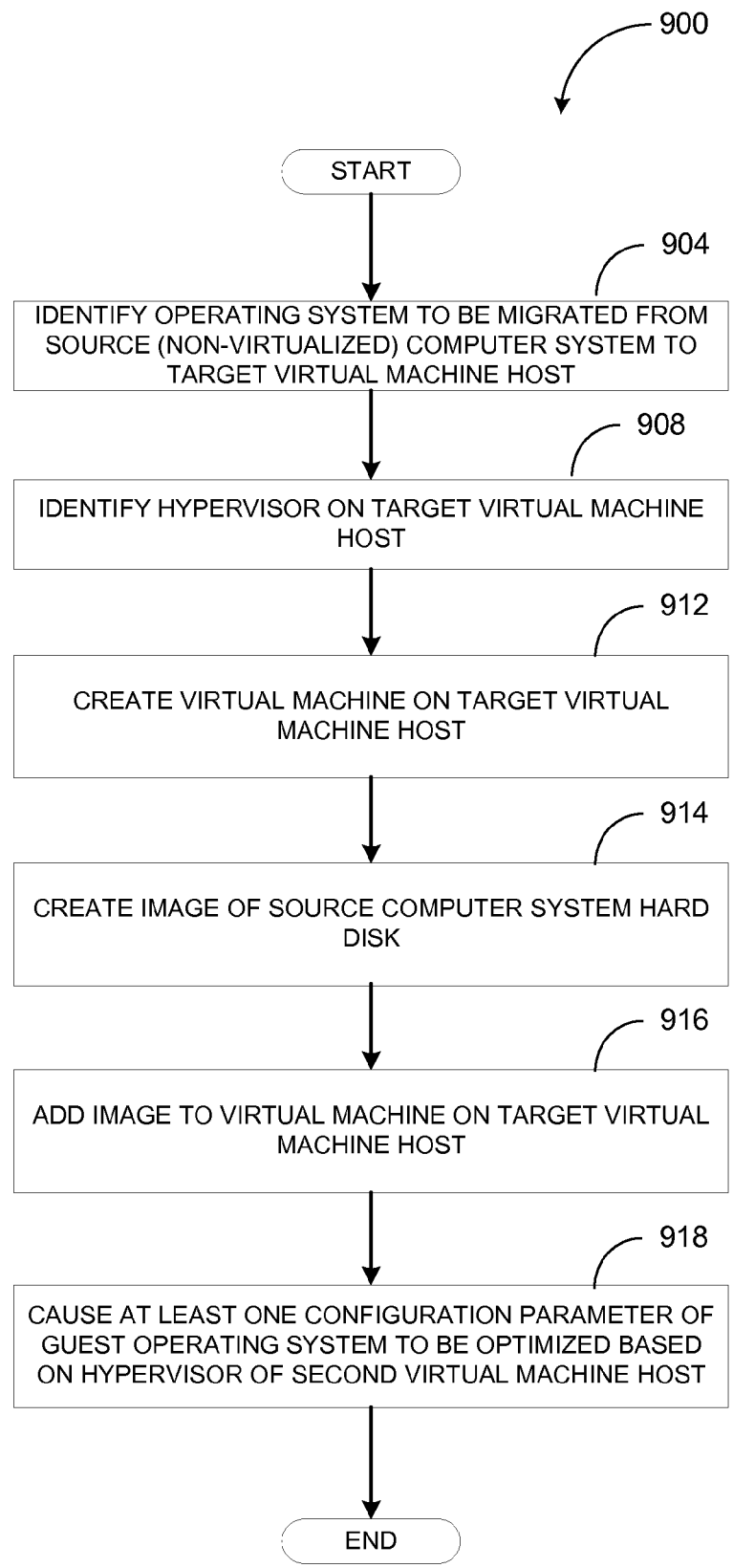
FIG. 9 is a flow diagram illustrating a method of adjusting an operating system for a hypervisor when the operating system is migrated from a source computer system to a target virtual machine host, according to one embodiment.

FIG. 9 is a flow diagram illustrating a method of adjusting an operating system for a hypervisor during a migration, according to a second embodiment. The method 900 may be performed by a computer system 1000 of FIG. 10 that may comprise hardware (e.g., circuitry, dedicated logic, programmable logic, microcode, etc.), software (e.g., instructions run on a processing device), or a combination thereof. In one embodiment, the method 900 is performed by the migration tool 204 (FIGS. 2A and 2B).

Referring to FIG. 9, the method 900 starts when the migration tool 204 identifies an operating system to be migrated from a source (non-virtualized) computer system to a virtual machine host (block 904). The migration tool 204 may use the migration module 408 to migrate an operating system to the hypervisor, as discussed above in conjunction with FIG. 4. During the migration, the migration tool 204 may identify and/or detect the hypervisor 132 (block 908). The migration tool 204 may use the identifying module 404 to identify and/or detect the hypervisor. The migration tool 204 may also identify and/or detect the type of the hypervisor, as discussed in more detail above.

At block 912, the migration tool 204 creates a virtual machine on the virtual machine host. In one embodiment, the migration tool 204 may convert an existing virtual machine running under a first hypervisor, to a format compatible with a target hypervisor running on a target virtual machine host. This may be referred to as a virtual to virtual (v2v) migration. For example, the migration tool 204 may convert a hard disk image which was originally created in the Virtual Machine Disk (VMDK) format for VMWare hypervisors, to the QEMU Copy On Write 2 (QCOW2) format for KVM hypervisors. A v2v migration may not involve changing the on-disk representation of the VM disk image. In another embodiment, the migration tool 204 may make a copy of the actual contents of a physical hard disk of a physical machine, and create a hard disk image on a target virtual machine. This may be referred to as a physical to virtual (p2v) migration. At block 914, the migration tool 204 creates an image of the physical machine hard disk. (e.g., hard disk of source computer system). At block 916, the migration tool 204 adds the image of the physical machine to the virtual machine created on the virtual machine host. In one embodiment, the migration tool 204 may convert the hard disk image created at block 914, to a format compatible with the hypervisor on the target virtual machine host.

At block 918, the migration tool 204 causes at least one configuration parameter of the operating system to be adjusted based on the hypervisor on the virtual machine host. For example, the migration tool 204 may determine that the hypervisor is a KVM type hypervisor by requesting this information from the hypervisor or by reading configuration data from a data store maintained by the hypervisor or the virtual machine host, and may set at least one configuration parameter of the operating system based on the detected KVM type hypervisor.

In one embodiment, the migration tool 204 may change and/or adjust at least one configuration parameter of the operating system at various times during migration. For example, the migration tool may change and/or adjust the configuration parameter before, during, and/or after the operating system is migrated to the virtual machine host. The migration tool 204 may use a service configured to set the configuration parameters based on the hypervisor. In another embodiment, the migration tool 204 may update a configuration file using a value (e.g., an optimal value) for at least one configuration parameter, based on user input (e.g., via graphical user interface) or automatic determination of the optimal value. In yet another embodiment, the parameter module 412 may directly adjust and/or change a setting within the operating system.

In one embodiment, prior to performing block 918, the migration tool 204 checks whether the user has requested changes and/or adjustments in at least one configuration parameter of the operating system. For example, the migration tool 204 may check whether user input was received from a user via the user interface. If no changes and/or adjustments in at least one configuration parameter were requested by the users, the migration tool 204 does not perform block 918. If a user requests changes and/or adjustments to at least one configuration parameter of the operating system, the method 900 proceeds to block 918.

FIG. 10 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing system (processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1016, which communicate with each other via a bus 1006.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute instructions 1026 of installer 133 and/or migration tool 204 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1016 may include a computer-readable medium 1024 on which is stored one or more sets of instructions 1026 (e.g., instructions 1026 of the installer 133 and/or migration tool 204) embodying any one or more of the methodologies or functions described herein. The instructions 1026 of the installer 133 and/or migration tool 204 may also reside, completely or at least partially, within the main memory 1004 and/or within the processor 1002 during execution thereof by the computer system 1000, the main memory 1004 and the processor 1002 also constituting computer-readable media. The instructions 1026 of the installer 133 and/or migration tool 204 may further be transmitted or received over a network 1021 via the network interface device 1022.

While the computer-readable storage medium 1024 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting", "identifying", "obtaining", "installing", "migrating", "causing", "displaying", "receiving", "setting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It should be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

detecting that an operating system to be installed on a host computer is to be run under a hypervisor by identifying a type of virtual device being used by a virtual machine that is associated with the hypervisor;

providing a user interface comprising a plurality of options for a configuration parameter of the operating system in view of the hypervisor and before the operating system is installed on the host computer, wherein the plurality of options comprises a first option to adjust the configuration parameter of the operating system in view of the hypervisor to enhance the operating system with the hypervisor when interfacing with hardware of the host computer by having the operating system write data to a storage resource associated with the host computer without using a caching operation and a second option to adjust the configuration parameter of the operating system in view of the hardware of the host computer to enhance the operating system when interfacing with the hardware of the host computer by having the operating system write data to the storage resource associated with the host computer by using the caching operation;

identifying a policy associated with the host computer; and adjusting, by a processing device, the configuration parameter of the operating system in view of the hypervisor, a selection of one of the first option or the second option for the configuration parameter from the user interface, and the policy associated with the host computer, wherein the adjusting of the configuration parameter changes how the operating system interfaces with the hardware of the host computer in view of the hypervisor.

2. The method of claim 1, wherein the adjusting of the configuration parameter comprises:

providing the user interface facilitating user input as to whether the configuration parameter is to be changed;

receiving user input requesting that the configuration parameter be adjusted; and setting the configuration parameter to a value corresponding to the hypervisor or suitable for one or more hypervisors.

3. The method of claim 1, wherein adjusting the configuration parameter comprises updating a configuration file using a value for the configuration parameter in view of the hypervisor.

4. The method of claim 1, wherein adjusting the configuration parameter comprises enabling, by an installer, a service to set the configuration parameter to a value in view of the hypervisor.

5. The method of claim 1, wherein adjusting the configuration parameter comprises setting, by an installer, the configuration parameter to a value in view of the hypervisor or a value acceptable for multiple hypervisors.

6. The method of claim 1, wherein detecting that the operating system is to be run under the hypervisor comprises:

detecting one or more virtual machine attributes.

7. The method of claim 1, wherein detecting that the operating system is to be run under the hypervisor comprises:

receiving a message from the hypervisor.

8. The method of claim 4, wherein adjusting the configuration parameter further comprises starting the service.

9. An apparatus comprising:

a memory; and a processing device, operatively coupled with the memory, to:

detect that an operating system to be installed on a host computer is to be run under a hypervisor by identifying a type of virtual device being used by a virtual machine that is associated with the hypervisor;

provide a user interface comprising a plurality of options for a configuration parameter of the operating system in view of the hypervisor from the user interface and before the operating system is installed on the host computer, wherein the plurality of options comprises a first option to adjust the configuration parameter of the operating system in view of the hypervisor to enhance the operating system with the hypervisor when interfacing with hardware of the host computer by having the operating system write data to a storage resource associated with the host computer without using a caching operation and a second option to adjust the configuration parameter of the operating system in view of hardware of the host computer to enhance the operating system when interfacing with the hardware of the host computer by having the operating system write data to the storage resource associated with the host computer by using the caching operation;

identify a policy associated with the host computer; and adjust the configuration parameter of the operating system in view of the hypervisor, a selection of one of the first option or the second option for the configuration parameter, and the policy associated with the host computer, wherein the adjusting of the configuration parameter changes how the operating system interfaces with the hardware of the host computer in view of the identified type of the hypervisor.

10. The apparatus of claim 9, wherein the processing device is further to:

identify a type of the hypervisor.

11. The apparatus of claim 9, wherein to adjust the configuration parameter, the processing device is further to:

provide the user interface facilitating user input as to whether the configuration parameter is to be changed;

receive user input requesting that the configuration parameter be adjusted; and set the configuration parameter to a value corresponding to the hypervisor or suitable for one or more hypervisors.

12. The apparatus of claim 9, wherein to adjust the configuration parameter, the processing device is to perform one or more of:

updating a configuration file using a value for the configuration parameter in view of the identified type of the hypervisor;

enabling a service to set the configuration parameter to a value in view of the identified type of the hypervisor; or setting the configuration parameter to a value in view of the identified type of the hypervisor or a value acceptable for multiple types of hypervisors.

13. The apparatus of claim 9, wherein to detect that the operating system is to be run under the hypervisor, the processing device is further to perform one or more of:
  detecting one or more virtual machine attributes; and
  receiving a message from the hypervisor.

14. The apparatus of claim 12, wherein to adjust the configuration parameter, the processing device is further to start the service.

15. A non-transitory machine-readable storage medium comprising instructions that, when executed by a processing device, cause the processing device to:
  detect that an operating system to be installed on a host computer is to be run under a hypervisor by identifying a type of virtual device being used by a virtual machine that is associated with the hypervisor;
  provide a user interface comprising a plurality of options for a configuration parameter of the operating system in view of the hypervisor and before the operating system is installed on the host computer, wherein the plurality of options comprises a first option to adjust the configuration parameter of the operating system in view of the hypervisor to enhance the operating system with the hypervisor when interfacing with hardware of the host computer by having the operating system write data to a storage resource associated with the host computer without using a caching operation and a second option to adjust the configuration parameter of the operating system in view of hardware of the host computer to enhance the operating system when interfacing with the hardware of the host computer by having the operating system write data to the storage resource associated with the host computer by using the caching operation;
  identify a policy associated with the host computer; and
  adjust, by the processing device, the configuration parameter of the operating system in view of the hypervisor, a selection of one of the first option or the second option for the configuration parameter from the user interface, and the policy associated with the host computer, wherein the adjusting of the configuration parameter changes how the operating system interfaces with hardware of the host computer in view of the hypervisor.

16. The non-transitory machine-readable storage medium of claim 15, wherein the processing device is further to:
  identify a type of the hypervisor.

17. The non-transitory machine-readable storage medium of claim 15, wherein to adjust the configuration parameter, the processing device is to:
  provide the user interface facilitating user input as to whether the configuration parameter is to be changed;
  receive user input requesting that the configuration parameter be adjusted; and
  set the configuration parameter to a value corresponding to the hypervisor or suitable for one or more hypervisors.

18. The non-transitory machine-readable storage medium of claim 15, wherein to adjust the configuration parameter, the processing device is to perform one or more of:
  update a configuration file using a value for the configuration parameter in view of the hypervisor;
  enable a service to set the configuration parameter to a value in view of the hypervisor; or
  set the configuration parameter to a value in view of the hypervisor or a value acceptable for multiple hypervisors.

19. The non-transitory machine-readable storage medium of claim 15, wherein to detect that the operating system is to be run under the hypervisor, the processing device is to perform one or more of:
  detect one or more virtual machine attributes; or
  receive a message from the hypervisor.

20. The non-transitory machine-readable storage medium of claim 18, wherein to adjust the configuration parameter, the processing device is to start the service.

21. The method of claim 1, wherein detecting that the operating system to be installed on the host computer is to be run under the hypervisor is further in view of an identification string for the virtual device.

* * * * *